United States Patent
Ramirez et al.

(10) Patent No.: US 11,270,371 B2
(45) Date of Patent: Mar. 8, 2022

(54) SYSTEM AND METHOD FOR ORDER PACKING

(71) Applicant: Walmart Apollo, LLC, Bentonville, AR (US)

(72) Inventors: Jeremy C. Ramirez, Centerton, AR (US); Jessica Solana, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 1017 days.

(21) Appl. No.: 15/917,275

(22) Filed: Mar. 9, 2018

(65) Prior Publication Data

US 2018/0260881 A1    Sep. 13, 2018

Related U.S. Application Data

(60) Provisional application No. 62/470,029, filed on Mar. 10, 2017.

(51) Int. Cl.
*G06Q 30/06* (2012.01)
*G06Q 10/08* (2012.01)
(Continued)

(52) U.S. Cl.
CPC ..... *G06Q 30/0635* (2013.01); *G06Q 10/0875* (2013.01); *G06Q 10/08355* (2013.01); *G06Q 10/109* (2013.01); *G06Q 30/016* (2013.01)

(58) Field of Classification Search
CPC ......... G06Q 30/0635; G06Q 10/08355; G06Q 10/0875; G06Q 10/109; G06Q 30/16
See application file for complete search history.

(56) References Cited

U.S. PATENT DOCUMENTS

| 3,908,800 | A | * | 9/1975 | Drapeau | B65G 1/1375 |
| | | | | | 186/56 |
| 5,434,394 | A | * | 7/1995 | Roach | A47F 9/046 |
| | | | | | 235/375 |

(Continued)

FOREIGN PATENT DOCUMENTS

| CN | 103632026 A | 3/2014 | | |
| WO | WO-2016166417 A1 | * 10/2016 | ............. | G06Q 50/20 |
| WO | WO-2017198281 A1 | * 11/2017 | ............. | B65B 5/105 |

OTHER PUBLICATIONS

Tzu Li Chen, "An efficient hybrid algorithm for integrated order batching, sequencing and routing problem", ScienceDirect, Sep. 28, 2014, all pages (Year: 2014).*

(Continued)

*Primary Examiner* — Omar Zeroual
(74) *Attorney, Agent, or Firm* — Duane Morris LLP; Manita Rawat

(57) ABSTRACT

Systems, methods, and computer-readable storage media for improved warehouse operations are provided. A consolidation processor (manual or automatic) establishes a connection to a warehouse management system. The current collection location of the consolidation processor may maybe established either manually or by automatically transmitting their current physical location in a facility to the warehouse management system. The warehouse management system may then direct the consolidation processor to a consolidation location to package orders for shipment. This direction may be given based on one or more parameters.

13 Claims, 3 Drawing Sheets

(51) Int. Cl.
*G06Q 10/10* (2012.01)
*G06Q 30/00* (2012.01)

(56) References Cited

U.S. PATENT DOCUMENTS

| | | | | | |
|---|---|---|---|---|---|
| 5,468,110 | A * | 11/1995 | McDonald | | B65G 1/1371 414/268 |
| 5,794,789 | A * | 8/1998 | Payson | | B07C 7/00 209/549 |
| 5,812,986 | A * | 9/1998 | Danelski | | G06F 3/147 705/22 |
| 5,875,434 | A * | 2/1999 | Matsuoka | | B65G 1/1376 705/28 |
| 6,011,998 | A * | 1/2000 | Lichti | | B65G 1/1376 414/268 |
| 6,193,160 | B1 * | 2/2001 | Zembitski | | G06K 7/10881 235/383 |
| 6,289,260 | B1 * | 9/2001 | Bradley | | B65G 1/1373 414/273 |
| 6,505,093 | B1 * | 1/2003 | Thatcher | | B65G 1/1376 700/214 |
| 6,543,983 | B1 * | 4/2003 | Felder | | B23Q 7/10 414/331.07 |
| 6,622,127 | B1 * | 9/2003 | Klots | | G06Q 10/06 705/28 |
| 6,762,681 | B1 * | 7/2004 | Danelski | | B65G 1/137 340/568.1 |
| 6,775,588 | B1 * | 8/2004 | Peck | | B65G 1/137 700/214 |
| 7,031,801 | B1 * | 4/2006 | Hodge | | B65G 1/137 700/213 |
| 7,110,855 | B2 * | 9/2006 | Leishman | | G06Q 10/087 700/214 |
| 7,139,637 | B1 * | 11/2006 | Waddington | | G06Q 10/04 700/216 |
| 7,158,856 | B2 * | 1/2007 | Sheehan | | G05B 19/4182 700/216 |
| 7,243,001 | B2 * | 7/2007 | Janert | | G06Q 10/08 700/213 |
| 7,331,471 | B1 * | 2/2008 | Shakes | | B07C 7/005 209/630 |
| 7,363,104 | B2 * | 4/2008 | Stevens | | A47B 53/00 700/213 |
| 7,377,429 | B2 * | 5/2008 | Anderson | | B07C 3/20 235/375 |
| 7,536,321 | B2 * | 5/2009 | Takahashi | | G06Q 10/063 705/330 |
| 7,774,243 | B1 * | 8/2010 | Antony | | G06Q 10/087 705/28 |
| 7,801,640 | B1 * | 9/2010 | Hodge | | B65G 1/137 700/213 |
| 7,894,933 | B2 * | 2/2011 | Mountz | | G06Q 10/087 700/214 |
| 7,979,359 | B1 * | 7/2011 | Young | | G06Q 10/06 705/332 |
| 7,984,809 | B1 * | 7/2011 | Ramey | | B65G 1/137 209/546 |
| 8,055,377 | B2 | 11/2011 | Yair et al. | | |
| 8,073,562 | B2 * | 12/2011 | Danelski | | B65G 1/1376 700/216 |
| 8,103,377 | B1 * | 1/2012 | Wong | | G06Q 10/087 700/216 |
| 8,165,929 | B2 * | 4/2012 | Chudy | | G06Q 10/087 705/28 |
| 8,170,712 | B2 * | 5/2012 | Battles | | B65G 1/1371 700/216 |
| 8,225,034 | B1 * | 7/2012 | Golla | | G06F 9/3836 711/109 |
| 8,234,006 | B1 * | 7/2012 | Sachar | | G06Q 10/087 700/216 |
| 8,560,114 | B2 * | 10/2013 | Suess | | B65G 1/137 700/216 |
| 8,560,407 | B2 * | 10/2013 | Buonagurio | | G06Q 10/087 705/28 |
| 8,571,915 | B1 * | 10/2013 | Wong | | G06Q 10/06 705/7.26 |
| 8,626,548 | B2 * | 1/2014 | Patel | | G06Q 10/06 705/7.15 |
| 8,694,154 | B2 * | 4/2014 | Winkler | | B65G 1/137 700/216 |
| 8,965,562 | B1 * | 2/2015 | Wurman | | G06Q 10/087 700/216 |
| 8,972,043 | B2 * | 3/2015 | Foster | | G06Q 30/0601 700/216 |
| 8,989,922 | B2 * | 3/2015 | Jones | | B64C 39/024 701/3 |
| 9,171,278 | B1 * | 10/2015 | Kong | | B65G 1/137 |
| 9,188,982 | B2 * | 11/2015 | Thomson | | G05D 1/0291 |
| 9,280,757 | B2 * | 3/2016 | Parpia | | G06Q 10/087 |
| 9,382,068 | B1 * | 7/2016 | Quan | | G06Q 10/083 |
| 9,451,674 | B1 * | 9/2016 | Kong | | H05B 47/155 |
| 9,466,046 | B1 * | 10/2016 | Theobald | | B65G 1/0492 |
| 9,505,554 | B1 * | 11/2016 | Kong | | G06T 7/254 |
| 9,550,624 | B2 * | 1/2017 | Khodl | | B25J 5/007 |
| 9,555,978 | B1 * | 1/2017 | Hanssen | | B65G 1/1378 |
| 9,580,248 | B2 * | 2/2017 | Hasman | | G06Q 10/087 |
| 9,637,310 | B1 * | 5/2017 | Zou | | B65G 43/10 |
| 9,733,633 | B2 * | 8/2017 | Wickham | | G05B 13/047 |
| 10,029,851 | B1 * | 7/2018 | Durham | | B65G 1/1373 |
| 11,008,166 | B2 * | 5/2021 | Gravelle | | B65G 1/04 |
| 11,017,349 | B1 * | 5/2021 | Diorio | | G08B 13/2485 |
| 11,176,513 | B1 * | 11/2021 | Park | | G06Q 10/047 |
| 2002/0092801 | A1 * | 7/2002 | Dominguez | | B07C 5/3412 209/583 |
| 2002/0115341 | A1 * | 8/2002 | Hein | | H01R 25/14 439/495 |
| 2002/0169698 | A1 * | 11/2002 | Chien | | G06Q 10/087 705/28 |
| 2003/0009396 | A1 * | 1/2003 | DeVries | | G06Q 10/087 705/28 |
| 2003/0233165 | A1 * | 12/2003 | Hein | | G06Q 10/087 700/216 |
| 2004/0068443 | A1 * | 4/2004 | Hopson | | G06Q 30/0635 705/5 |
| 2004/0088229 | A1 * | 5/2004 | Xu | | G06Q 10/087 705/28 |
| 2004/0153207 | A1 * | 8/2004 | Peck | | B65G 1/1373 700/214 |
| 2004/0153379 | A1 * | 8/2004 | Joyce | | G06Q 10/087 705/28 |
| 2004/0238326 | A1 * | 12/2004 | Lichti | | B65G 17/123 198/475.1 |
| 2005/0102203 | A1 * | 5/2005 | Keong | | H04L 29/06 705/28 |
| 2006/0020366 | A1 * | 1/2006 | Bloom | | B07C 3/02 700/226 |
| 2006/0059049 | A1 * | 3/2006 | Morris | | G06Q 30/02 705/26.1 |
| 2006/0131379 | A1 * | 6/2006 | Aoki | | G06Q 10/087 235/376 |
| 2006/0182543 | A1 * | 8/2006 | Schaefer | | B65G 1/137 414/222.01 |
| 2006/0235557 | A1 * | 10/2006 | Knight | | G06Q 10/087 700/103 |
| 2007/0050080 | A1 * | 3/2007 | Peck | | B65G 1/137 700/214 |
| 2007/0136152 | A1 * | 6/2007 | Dunsker | | G06Q 10/08 705/28 |
| 2007/0150383 | A1 * | 6/2007 | Shakes | | G06Q 10/0875 705/29 |
| 2007/0156372 | A1 * | 7/2007 | Christ | | G06Q 10/06 702/158 |
| 2007/0288306 | A1 * | 12/2007 | Ohishi | | G06Q 10/06 700/113 |
| 2008/0001372 | A1 * | 1/2008 | Hoffman | | G05D 1/0297 280/35 |
| 2008/0091574 | A1 * | 4/2008 | Hamaji | | G06Q 10/087 705/28 |

(56) References Cited

U.S. PATENT DOCUMENTS

| | | | |
|---|---|---|---|
| 2008/0183328 A1* | 7/2008 | Danelski | G06Q 50/30 700/216 |
| 2008/0215179 A1* | 9/2008 | Yair | G06Q 10/087 700/215 |
| 2009/0000912 A1* | 1/2009 | Battles | B65G 1/1371 198/431 |
| 2009/0012836 A1* | 1/2009 | Weissbach | G06Q 10/063112 705/7.11 |
| 2009/0299521 A1* | 12/2009 | Hansl | B65G 1/1378 700/215 |
| 2010/0033341 A1* | 2/2010 | Ishida | G06Q 10/087 340/8.1 |
| 2010/0057542 A1* | 3/2010 | Hironaka | G06Q 10/06398 705/7.42 |
| 2010/0176964 A1* | 7/2010 | Kobayashi | G06Q 10/08 340/8.1 |
| 2010/0316470 A1* | 12/2010 | Lert | B65G 1/0492 414/273 |
| 2011/0008137 A1* | 1/2011 | Yamashita | B65G 1/0492 414/267 |
| 2011/0035247 A1* | 2/2011 | Perry | G06Q 10/087 705/7.38 |
| 2011/0084162 A1* | 4/2011 | Goossen | B64D 1/22 244/12.1 |
| 2011/0203231 A1* | 8/2011 | Hortig | B65G 1/1378 53/473 |
| 2011/0295413 A1* | 12/2011 | Hara | G06Q 10/087 700/216 |
| 2011/0301994 A1* | 12/2011 | Tieman | G06Q 10/06 705/7.15 |
| 2012/0029683 A1* | 2/2012 | Keller | B25J 9/1687 700/214 |
| 2012/0029685 A1* | 2/2012 | Keller | G06Q 10/087 700/216 |
| 2012/0072438 A1* | 3/2012 | Bast | G06Q 10/06 707/758 |
| 2012/0109362 A1* | 5/2012 | Goodman | B65G 47/918 700/213 |
| 2012/0291037 A1* | 11/2012 | Venkataramanan | G06F 9/3855 718/103 |
| 2012/0330458 A1* | 12/2012 | Weiss | B66F 9/063 700/216 |
| 2013/0096713 A1* | 4/2013 | Takizawa | B65G 61/00 700/224 |
| 2013/0096735 A1* | 4/2013 | Byford | G05D 1/0234 701/2 |
| 2013/0110280 A1* | 5/2013 | Folk | B25J 9/1697 700/215 |
| 2013/0110281 A1* | 5/2013 | Jones | G06Q 50/28 700/228 |
| 2013/0200916 A1* | 8/2013 | Panagas | H01L 21/67727 324/757.01 |
| 2013/0312371 A1* | 11/2013 | Ambrose | B65G 1/137 53/473 |
| 2013/0317642 A1* | 11/2013 | Asaria | G06Q 10/08 700/216 |
| 2013/0338819 A1* | 12/2013 | Max | G06F 7/00 700/216 |
| 2014/0032034 A1* | 1/2014 | Raptopoulos | G05D 1/0088 701/25 |
| 2014/0032035 A1* | 1/2014 | Thomson | G05D 1/0291 701/25 |
| 2014/0040075 A1* | 2/2014 | Perry | G06Q 30/0635 705/26.81 |
| 2014/0052498 A1* | 2/2014 | Marshall | G07F 11/28 705/7.35 |
| 2014/0058556 A1* | 2/2014 | Kawano | G05D 1/0297 700/216 |
| 2014/0081445 A1* | 3/2014 | Villamar | G06Q 10/087 700/216 |
| 2014/0088758 A1* | 3/2014 | Lert | B65G 1/1378 700/216 |
| 2014/0100999 A1* | 4/2014 | Mountz | G06Q 10/087 705/28 |
| 2014/0107833 A1* | 4/2014 | Segawa | G06Q 10/087 700/214 |
| 2014/0108028 A1* | 4/2014 | Braun | G16H 20/13 705/2 |
| 2014/0149244 A1* | 5/2014 | Abhyanker | G06Q 10/10 705/26.2 |
| 2014/0156553 A1* | 6/2014 | Leach | G06Q 10/08355 705/338 |
| 2014/0244026 A1* | 8/2014 | Neiser | B65G 1/1378 700/216 |
| 2014/0254896 A1* | 9/2014 | Zhou | B64C 39/024 382/124 |
| 2014/0277854 A1* | 9/2014 | Jones | G06Q 30/0261 701/3 |
| 2014/0279294 A1* | 9/2014 | Field-Darragh | H04B 5/0062 705/28 |
| 2014/0350717 A1* | 11/2014 | Dagle | B65G 1/1373 700/216 |
| 2014/0351101 A1* | 11/2014 | Danelski | G06Q 10/087 705/28 |
| 2015/0025714 A1* | 1/2015 | Beer | B61L 27/00 701/19 |
| 2015/0026436 A1* | 1/2015 | Achenbach | G06F 9/3838 712/214 |
| 2015/0032252 A1* | 1/2015 | Galluzzo | B60P 1/5423 700/218 |
| 2015/0057793 A1* | 2/2015 | Kawano | B25J 15/08 700/216 |
| 2015/0068875 A1* | 3/2015 | Berghorn | G06Q 10/08 198/890.1 |
| 2015/0073589 A1* | 3/2015 | Khodl | B65G 1/1378 700/218 |
| 2015/0086304 A1* | 3/2015 | Hasman | G06Q 10/087 414/269 |
| 2015/0100461 A1* | 4/2015 | Baryakar | B25J 19/023 705/26.43 |
| 2015/0104286 A1* | 4/2015 | Hansl | B65G 37/00 414/800 |
| 2015/0120514 A1* | 4/2015 | Deshpande | G06Q 30/0635 705/28 |
| 2015/0178671 A1* | 6/2015 | Jones | G06Q 10/087 705/28 |
| 2015/0269521 A1* | 9/2015 | Knapp | G06Q 10/08355 705/338 |
| 2015/0294260 A1* | 10/2015 | Napoli | G06Q 10/087 705/337 |
| 2015/0294395 A1 | 10/2015 | Deshpande et al. | |
| 2015/0307278 A1* | 10/2015 | Wickham | G05B 15/02 700/216 |
| 2015/0332206 A1* | 11/2015 | Trew | G06Q 10/083 705/330 |
| 2015/0370251 A1* | 12/2015 | Siegel | G05D 1/00 701/2 |
| 2016/0027093 A1* | 1/2016 | Crebier | G07F 17/13 705/26.81 |
| 2016/0027095 A1* | 1/2016 | Boer | G02B 27/20 414/800 |
| 2016/0042314 A1* | 2/2016 | Mountz | G08C 17/02 705/28 |
| 2016/0078523 A1* | 3/2016 | Lopez | G06Q 30/0601 705/26.81 |
| 2016/0229634 A1* | 8/2016 | Yamashita | B65G 1/1378 |
| 2016/0260046 A1* | 9/2016 | Cai | G16H 70/20 |
| 2016/0260158 A1* | 9/2016 | High | G05D 1/0027 |
| 2016/0355338 A1* | 12/2016 | Kazama | B65G 1/1378 |
| 2017/0088355 A1* | 3/2017 | Khodl | G06Q 50/30 |
| 2017/0158431 A1* | 6/2017 | Hamilton | B65G 1/0492 |
| 2017/0278047 A1* | 9/2017 | Welty | G05D 1/0011 |
| 2017/0313516 A1* | 11/2017 | Kazama | B65G 1/137 |
| 2017/0323250 A1* | 11/2017 | Lindbo | G06Q 10/08345 |
| 2018/0043533 A1* | 2/2018 | Johnson | G05D 1/0297 |
| 2018/0057264 A1* | 3/2018 | Wicks | G06Q 10/087 |
| 2018/0075402 A1* | 3/2018 | Stadie | G06Q 50/28 |
| 2018/0108102 A1* | 4/2018 | Kapuria | G06Q 50/28 |

(56) References Cited

U.S. PATENT DOCUMENTS

| | | | |
|---|---|---|---|
| 2018/0127212 A1* | 5/2018 | Jarvis | G05D 1/0234 |
| 2018/0134492 A1* | 5/2018 | Lert, Jr. | B66F 9/063 |
| 2018/0201444 A1* | 7/2018 | Welty | B25J 5/007 |
| 2018/0211347 A1* | 7/2018 | Chen | G05D 1/0297 |
| 2018/0218469 A1* | 8/2018 | Lert, Jr. | B65G 1/1371 |
| 2018/0225795 A1* | 8/2018 | Napoli | G06Q 10/06316 |
| 2018/0247257 A1* | 8/2018 | Lert, Jr. | B65G 1/1373 |
| 2018/0253682 A1* | 9/2018 | Gilman | G06Q 10/087 |
| 2018/0265297 A1* | 9/2018 | Nakano | B66F 9/06 |
| 2018/0319592 A1* | 11/2018 | Yamashita | B65G 1/0492 |
| 2019/0354924 A1* | 11/2019 | Fukushima | G06Q 10/0631 |
| 2020/0039747 A1* | 2/2020 | Ahmann | B65G 1/1375 |
| 2020/0047218 A1* | 2/2020 | Cherry | B07C 3/20 |
| 2020/0302390 A1* | 9/2020 | Elazary | G06Q 10/0875 |

OTHER PUBLICATIONS

Yi Fei Chuang, "Enhancing Order-picking Efficiency through Data Mining and Assignment Approaches ", published by WSEAS Transactions on business and Economics, in 2014, all pages (Year: 2014).*

Marita Ellinger, "How to choose an order picking system", published by GSU in 2012, all pages (Year: 2012).*

Sebastian Henn, "Algorithms for on-line order batching in an order picking warehouse", published by Computers and Operations Research, on Jan. 8, 2012, all pages (Year: 2012).*

Rene de Koster, "Design and control of warehouse order picking: A literature review", published by ScienceDirect, on Oct. 25, 2006, all pages (Year: 2006).*

Tho Le Duc, "Determining Number of Zones in a Pick-and-pack Order picking System", published by ERIM, in May 2005, all pages (Year: 2005).*

MengFei Yu, "Enhancing warehouse performance by efficient order picking", published by Rasmus University, in 2008, all pages (Year: 2008).*

Marco Melacini, "Development of a framework for pick-and-pass order picking system design", published by Springer-Verglag on Aug. 13, 2010, all pages (Year: 2010).*

Pratik Parikh, "Selecting between batch and zone order picking strategies in a distribution center", published by ScienceDirect in 2007, all pages (Year: 2007).*

Joachim Reese, "Supply Chain Management and reverse logistics", published by Springer in 2004, all pages (Year: 2004).*

Rupert Reif, "Pick-by-vision: augmented reality supported order picking", published by Springer-Verlag in 2009, all pages (Year: 2009).*

Mihaela Stet, "Order Picking Operations in Warehouse Systems", published by Oradea university in 2008, all pages (Year: 2008).*

Mengfei Yu,"The impact of order batching and picking area zoning on order picking system performance", published by ScienceDirect, on Sep. 20, 2008, all pages (Year: 2008).*

Daren Zhou, "Optimizing Order Consolidation with Simulation Optimization", published by Univeristy of Waterloo, in 2017, all pages (Year: 2017).*

Yossi Bukchin, "Optimizing a dynamic order-picking process", published by European Journal of Operational Research, on Jan. 5, 2012, all pages (Year: 2012).*

Kees Jan Roodbergen, "routing order pickers in a warehouse", published by Roodbergen.com on Jul. 2, 2015, all pages. (Year: 2015).*

Albert Causo, "Automated Robot Picking System for E-Commerce Fulfillment Warehouse Application", published by researchgate.com published on Oct. 2015, all pages. (Year: 2015).*

Dev Poudel, "Coordinating Hundreds of Cooperative, Autonomous Robots in a Warehouse", published by academia.edu in Jan. 2013, all pages (Year: 2013).*

A. Scholz, "Order Batching and Picker Routing in manual order picking systems: the benefits of integrated routing", published by Springer-Verlag on Jan. 2017, all pages (Year: 2017).*

Juntao Li, "Research on Task Allocation in Multiple Logistics Robots Based on an Improved ant Colony Algorithm", published by IEEE in 2016, all pages (Year: 2016).*

Rene de Koster, "Design and control of warehouse order picking: A literature review", published by Elsevier in 2006, all pages (Year: 2006).*

Rene de Koster, "Determining the Number of Zones in a Pick-and-sort Order Picking System", published by archives-ouverts.fr in 2012, all pages (Year: 2012).*

Crainic, T. G. et al., "Proactive Order Consolidation in the Retail Supply Chain"; Cirrelt, Sep. 2009 (17 pp).

* cited by examiner

SYSTEM AND METHOD FOR ORDER PACKING

CROSS-REFERENCE TO RELATED APPLICATIONS

This application claims priority to U.S. Provisional Patent Application No. 62/470,029 filed Mar. 10, 2017, which is incorporated herein by reference in its entirety for all purposes.

BACKGROUND

1. Technical Field

The present disclosure relates in general to systems and methods for processing items for shipment, and in particular, to dynamic processes and systems useful for warehouse and inventory management.

2. Introduction

In the drive to increase the efficiency and profitability of retail operations, improving the management of warehouse and inventory activities is often overlooked. Among the most time consuming and costly operations in a warehouse is order fulfillment—an activity that essentially involves the retrieval of items from their warehouse storage locations to fill customer orders. When tasked with a customer order, an order picker travels to and between pick locations, searches for items on the order, retrieves them, and direct them towards further downstream sorting. The picked orders are grouped at a collection location(s) based on order priority, item size and other parameters. The collection locations may include items for multiple customer orders.

Next, the items are collected from the collection location, and sorted into particular consolidation locations. This process is sometimes referred to as "putting" items. The consolidation locations may be include multiple customers or orders. Once all the items for an order or customer arrive at the consolidation location, the order is ready for packaging and shipping processes.

Consolidation processors, be they manual or automatic, freely travel from one consolidation location to another to pack the orders. Currently only the priority of an order within a consolidation location is used to direct the consolidation processor to a consolidation location and to an order within a consolidation location. With the current process, there are inefficiencies with the order completion process. For example, there may be many orders due at or about the same time. Order priority is not sufficient to distinguish between the importance of the orders or to develop the most efficient packing process. In addition, the lack of intelligence regarding the orders at the consolidation location impairs the packaging process.

In light of the above need, embodiments of the present invention provide dynamic processes and systems capable of improving the operation and efficiency of warehouse management systems, on a rolling real-time basis. Embodiments of the invention may be useful for managing warehouse and inventory operations, and specifically in connection with order fulfillment.

SUMMARY

Disclosed herein are systems, methods, and computer-readable storage mediums for improved inventory management. An exemplary method can include receiving information about items at each respective consolidation location, the information including an item priority and an associated customer for each respective item, wherein items associated with different customers are located at the same consolidation location; receiving location information regarding a current location of a consolidation processor; determining a number of items available for consolidation at each consolidation location in an area around the current location of consolidation processor; determining a distance from the current location of the consolidation processor to the consolidation locations with available items; determining an order priority for each consolidation location based on the item priority of the available items at that consolidation location; receiving a weight for the distance, the order priority of each consolidation location and the number of items available for each consolidation location; determining a priority score based on the distance, the order priority of each consolidation location and the number of items available for each consolidation location and the respective weights; providing instructions to the consolidation processor to proceed to the consolidation location with a highest priority score; providing instructions to the consolidation processor to scan items at that consolidation location based on whether the item completes an order, whether the item is the next to last step in completing the order and whether the item is starting an order; receiving information scanned from the items; and processing the scanned information.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
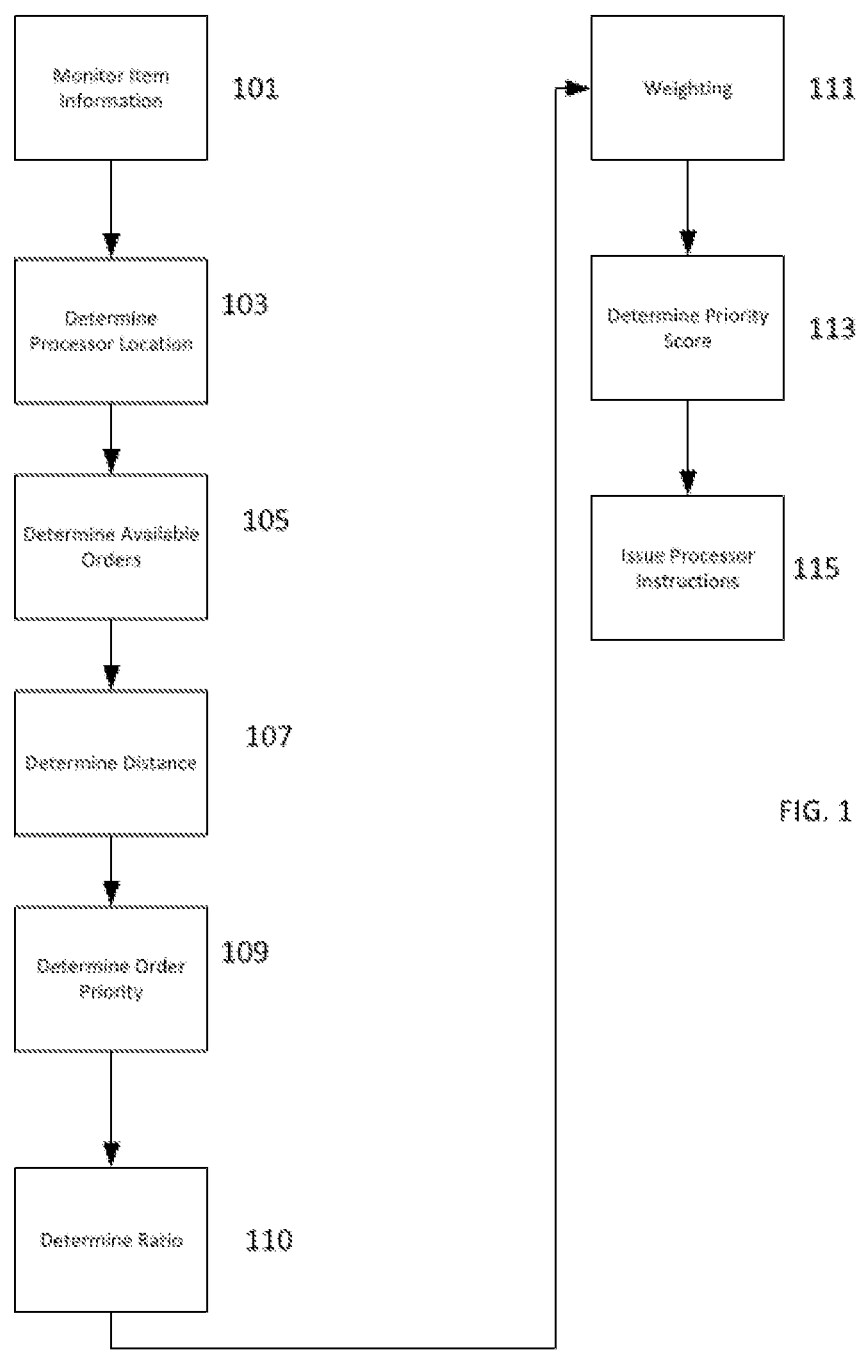
FIG. 1 illustrates an example flow.

Embodiments of the invention are related to processing items in retail facilities (particularly, in the warehouses thereof). Tasks or orders are received at a facility from one or more sources; then sorted, scheduled, and assigned to processors, and in a manner that reduces delay, promotes a more economic allocation of resources, and simplifies task performance. Comprehensive data for performing each task are monitored rigorously to ensure optimum performance.

In one implementation, a consolidation processor (manual or automatic, such as a robot, AGV or UAV, etc.) establishes a connection to a warehouse management system. The current location of the consolidation processor may be established either manually or by automatically transmitting their current physical location in a facility to the warehouse management system. The facility may include a number of consolidation locations, sometimes referred to as "walls." The consolidation locations may include a number of sub-locations, sometimes referred to as "cubbies." The warehouse management system may direct the consolidation processor to a consolidation location, and also to a sub-location within that consolidation location, to pack orders for shipping. This direction may be given based on one or more parameters.

Exemplary parameters may include one or more of:

Processor current location—this is the physical location of the consolidation processor in the facility; this parameter may be used to calculate the distance of the processor(s) from each consolidation location(s);

Available Orders—the total count of orders contained in a consolidation location available for packaging or shipment;

Order Priority—the priority level of orders contained in the consolidation location(s);

Order to Order Consolidation Sub-location Ratio—the ratio of the number of orders to the total number of consolidation sub-locations at each consolidation location; this improves consolidation location utilization.

More, less or different combinations of parameters may also be used depending on a particular implementation. The parameters may be combined to generate a priority score for the consolidation locations. The system may determine which consolidation location is to be processed based on the priority score.

The consolidation processor receives instructions and then physically moves to the consolidation location indicated by the system. At the directed consolidation location, the consolidation processor may be further guided by the warehouse management system to process orders for shipment contained in the consolidation location based off the order priority.

An "order" (or "task") may be an express or implied requisition to perform one or more tasks. An example of an "order" is a "service ticket" generated manually or automatically by warehouse management software, expressly requesting an inventory count of a particular product or SKU, or to restock certain shelves or bins, or to unload an incoming shipment at a particular docking zone. Another example is a "purchase order," generated online through a retail website or other e-commerce portal, expressly requesting delivery of purchased "item(s)," and thus, implicitly requiring the retrieval by consolidation processors of the item(s) (in addition to other upstream and downstream order fulfillment tasks).

Aside from e-commerce facilities, another example of a task-generator would be, as mentioned hereinabove, an "inventory management system" (also known as an "inventory control system"). An inventory management system is a set of hardware of software based tools that automate the process of tracking inventory. The kinds of inventory tracked with an inventory management system can include almost any type of quantifiable good, including food, clothing, books, equipment, and any other item that consumers, retailers, and wholesalers may purchase. Inventory management systems typically work in real time to electronically transmit information immediately to and from a central computer as buying, selling, and shipping transactions occur.

It will be appreciated that warehouse management systems and inventory management systems—especially for global retailers such as Wal-Mart Stores, Inc.—can be massive in their functionality, scale, and deployment. Record keeping, inventory tracking, and logistics will, in respect of activity likely predominate other functions, such as the assignment of tasks to workers. Nonetheless, for embodiments of the present invention, warehouse management systems are an expected and likely source of tasks.

It will also be appreciated that, although "warehouse management systems," "inventory management systems" and "e-commerce retail facilities" may be separate entities, it not uncommon in practice that these are enmeshed, merged, interlinked, interconnected, or fully and seamlessly integrated.

Embodiments of the invention provide dynamic warehouse management processes for processing items in a warehouse. The warehouse tasks (e.g., picking, putting, packaging, restocking, unloading, and tracking) typically originate from one or more task-generators (e.g., online purchasing and fulfillment facilities, inventory management systems, etc.) and are executed in a warehouse by a team of consolidation processors. As illustrated schematically in FIG. 1, the management process comprises several steps, which—in typical high-volume commercial practices employing high-speed digital communications, processors, and databases—will often be performed contemporaneously in a virtually seamless and continuous rate, thus achieving an "always on" presence.

According to the process, information about the orders at the consolidation locations is monitored. The information may have been collected during upstream processing, such as during item intake at the facility, or during the picking or putting processes. The information may include data such as the order's priority, ship to location, date due, items in the order, customer, and date of receipt. All of the information may be collected and monitored by the warehouse management system.

As used herein, a "priority may be any information representative of a temporal parameter, or other variable capable of influencing the scheduling of a task. Examples include: time-stamps; deadlines; priority codes (e.g., "urgent", "immediate", "low"); SLA ("Service Level Agreements") reference (i.e., to the extent such agreements may call for "rush" orders" or "expedited delivery"; and common carrier codes (i.e., to the extent that certain common carriers may impose deadlines to meet their delivery requirements).

In addition, the status of each of the consolidation processors is monitored. The status may include the progress of a consolidation processor in completing a task, their availability for new tasks, and the processor's location in the warehouse. The status may be monitored by the warehouse management system as described above. For example, the processor may scan a location or sign in to the warehouse management system at a location. In addition, the location may be monitored using GPS and other location tracking techniques. The location information may be one parameter used to determine which processor to send to geographic locations within the facility.

Several means are available for monitoring status information of items in the facility and the consolidation processor. For example, a system may employ a local computer network (i.e., at a warehouse) with several local wireless nodes and WAN access to larger computer facilities hosted remotely offsite at, for example, a corporation's global or regional headquarters. In such a system, certain status information (i.e., those that tend to be static, such as "skills" and "certifications") can be entered and stored at a data center; while other status information (i.e., those that tend to be ephemeral, such as "location" and "current activity") can be tracked locally (e.g., through the use of handheld scanning devices that transmit and receive information to and from the local computer network through its wireless nodes). Preferably, the transmission of ephemeral status information will call automatically for, and thus be supplemented with, the stored status information.

The frequency and degree to which status information is monitored will vary depending on the means employed. For comparatively small operations, the monitoring of only a few fields of basic status information may be desirable. By hosting this information locally, network and system bandwidth requirements can be reduced, and monitoring executed more frequently. In contrast, for larger operations, more comprehensive status information may be appropriate. Where several fields of Information are employed, distributing and sharing the information among local and remote resources may be desirable. For such, the frequency of monitoring can be throttled down to accommodate the comparatively larger system and bandwidth requirements. The particular types of status information is also variable, and likely will be a function of an inventory's product profile.

In respect of "location", examples of status information particularly relevant to warehouse task management, include: "Zone", "lane", "aisle", "area", "building", and "floor". Such information can be tracked as a consolidation processor performs assigned tasks by, for example, equipping him with a handheld scanner device with location detection functionality, or more simply, by placing location tags throughout the warehouse that the worker can scan and upload to a warehouse management system. For certain warehouse operations, product labels may be sufficient alone to provide location data for the items, rendering unnecessary separate location tags.

Referring to FIG. 1, another parameter that may be used to determine a priority score is available orders, 105. Available orders is the number of orders available for processing at a particular consolidation location. The higher the number of available orders, the more efficient it is to send a consolidation processor to that location.

Not all of the orders at a location may be available for processing. Some may be awaiting additional items. Available orders refers to those orders at a consolidation location that are ready for downstream processing. By monitoring the status of the orders at each location, the number of available orders at each location may be determined. The raw number of available orders or an adjusted/normalized number of available orders may be used to determine the priority score. The location of the processor may be determined as noted above. The number of available orders for processing at consolidation locations in the vicinity of the processor is determined, e.g., there may be 5 orders at one location and 2 orders at another location, etc. This raw number may serve as the basis for the available order parameter.

Another parameter that may be used to determine the priority score is distance, 107. The distance may be based on the distance to a consolidation location or other location from the consolidation processor's current location. The distance may be used to determine a raw distance score. The shorter the distance traveled, the higher the raw distance score. One or more raw distances may be combined into a single variable used to determine the distance parameter. The distance from the consolidation processor to an initial, and any subsequent, consolidation locations, may also be considered in determining the raw distance score. The system may monitor the location of consolidation processor as described above and can determine the distance from that location to consolidation locations.

Another parameter that may be used to determine a priority score for a consolidation location is an order priority, 109. Each order at a consolidation location may be due today, two days from now, etc. The priority information for the orders at a consolidation location is used to determine the order priority for that location. The locations and status information regarding the orders is monitored. Thus, it is know what orders are at what locations, as well as those orders' priorities. The order priority for the consolidation location may be an average of the order priorities for the orders available at that consolidation location. For example, if the consolidation location has ten orders available with respective priorities of 100, 100, 200, 500, 400, 500, 100, 300, 400, and 500, the average priority for the orders and the order priority for the consolidation location is 310. In another embodiment, the highest order priority for the orders at the consolidation location may be used.

Another parameter that may be used to determine the priority score is a ratio of the number of orders to the total number of consolidation sub-locations at each consolidation location, 110. A facility may have a number of consolidation locations, "walls". Each consolidation location may include a number of sub-locations, "cubbies." An order may be distributed over a number of cubbies in a wall if the order is larger or includes larger items. Some orders may fit into one cubbie. This parameter takes into account the number of orders versus the number of cubbies. For example, a wall may include 10 cubbies, and one order within the wall may take up 5 cubbies. Thus, packaging that order will process 5 cubbies, but only one order and the ratio is 10%. A wall with 10 cubbies and 2 orders over 2 cubbies will have a ratio of 20%.

Each of the parameters for a consolidation location and/or consolidation processor may be combined to determine a priority score for the consolidation location, 111-113. This may be done for every consolidation location near the consolidation processor, for example in the same zone. In the example embodiment, the parameters may be weighted based on a particular implementation and preferences. For example, if distance traveled is important to an organization, the weight for that parameter will be set high. In exemplary embodiments, the importance, and thus the weight, of a parameter may change throughout the day. Early in the day it may be more important to be more efficient, that is, pack the most orders. Thus, the ratio, available orders, and distance parameters may be more heavily weighted earlier in the day. As the day progresses, it may be more important to get out orders that are due today. Thus, order priority may be more heavily weighted near the end of the day. Same or different weights may be used for each of the parameters.

The following equation may be used to determine the priority score for a consolidation location:

$$\begin{aligned} \text{Score} &= W \cdot P \\ &= [w_1, w_2, w_3, \ldots, w_n] \cdot [p_1, p_2, p_3, \ldots, p_n] \\ &= w_1 p_1 + w_2 p_2 + w_3 p_3 + \ldots + w_n p_n \\ &= \sum_{i=1}^{n} w_i p_i \end{aligned}$$

Where w=weight

P=parameter

Once the priority score is determined the consolidation processor is directed to a consolidation location based on the priority scores for the consolidation locations, 115. The consolidation processor may be instructed to proceed directly to the consolidation location with the highest priority score. In another embodiment the consolidation locations may be ranked according to highest priority score. The consolidation processor may be provided a list of consolidations locations, for example, with high priority scores or scores over a threshold, and is permitted to select a consolidation location to process. In another embodiment the system may direct the consolidation processor to a specific consolidation location when the priority score exceeds a threshold. This may occur when a consolidation location has a high density of high priority orders in a location close to the consolidation processor. The system may determine that any location with a score over the threshold is an automatic assignment.

The instructions and listings may be sent to a mobile device used by the consolidation processor or to the consolidation processor itself, for example when the consolidation processor is a robot. The consolidation processor proceeds to the designated consolidation location and scans the orders at that location. As the consolidation processor scans and collects the orders at the consolidation location, the system may update and recalculate the priority score for other processors.

Figure 2:
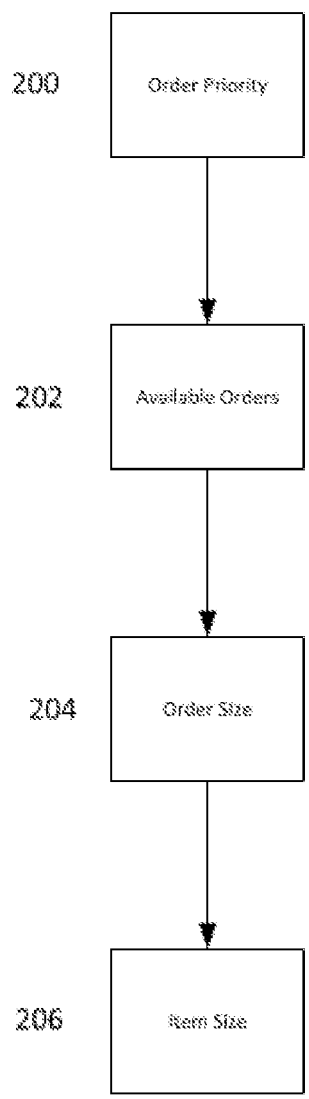
FIG. 2 illustrates an exemplary method embodiment.

In a further embodiment shown in FIG. 2, once the consolidation processor is directed to a consolidation location, the consolidation processor may be directed to specific orders to pack from the consolidation location. This may make those orders available for the next step faster, promoting efficiency. The sequence initially may be based on the order priority, those with the highest priority are processed first, 200. If there is a tie in priority, other factors may considered. These may include the available orders 202, number of items in an order 204 and item size 206. The orders at the location are eventually all packaged and the processor may be provided with the next location for processing.

Figure 3:
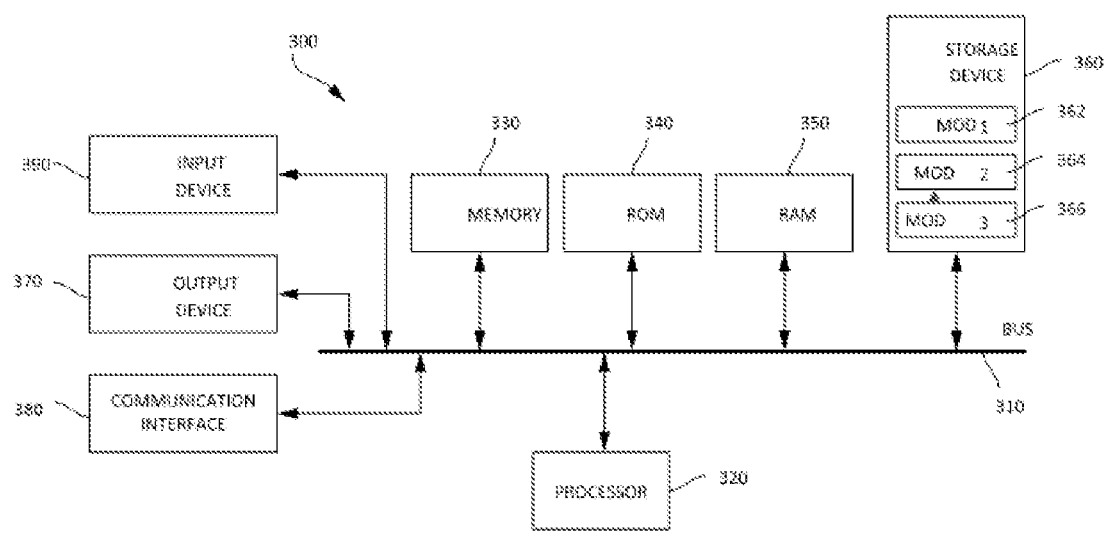
FIG. 3 illustrates an example computer system which can be used to perform embodiments of the invention.

FIG. 3 illustrates an example computer system which can be used to perform inventory management operations as disclosed herein. More specifically, FIG. 3 illustrates a general-purpose computing device 300, including a processing unit (CPU or processor) 320 and a system bus 310 that couples various system components including the system memory 330 such as read only memory (ROM) 340 and random access memory (RAM) 350 to the processor 320. The system 300 can include a cache 322 of high speed memory connected directly with, in close proximity to, or integrated as part of the processor 320. The system 300 copies data from the memory 330 and/or the storage device 360 to the cache 322 for quick access by the processor 320. In this way, the cache provides a performance boost that avoids processor 320 delays while waiting for data. These and other modules can control or be configured to control the processor 320 to perform various actions. Other system memory 330 may be available for use as well. The memory 330 can include multiple different types of memory with different performance characteristics. It can be appreciated that the disclosure may operate on a computing device 300 with more than one processor 320 or on a group or cluster of computing devices networked together to provide greater processing capability. The processor 320 can include any general purpose processor and a hardware module or software module, such as module 4 362, module 2 364, and module 3 366 stored in storage device 360, configured to control the processor 320 as well as a special-purpose processor where software instructions are incorporated into the actual processor design. The processor 320 may essentially be a completely self-contained computing system, containing multiple cores or processors, a bus, memory controller, cache, etc. A multi-core processor may be symmetric or asymmetric.

The system bus 310 may be any of several types of bus structures including a memory bus or memory controller, a peripheral bus, and a local bus using any of a variety of bus architectures. A basic input/output (BIOS) stored in ROM 340 or the like, may provide the basic routine that helps to transfer information between elements within the computing device 300, such as during start-up. The computing device 300 further includes storage devices 360 such as a hard disk drive, a magnetic disk drive, an optical disk drive, tape drive or the like. The storage device 360 can include software modules 362, 364, 366 for controlling the processor 320. Other hardware or software modules are contemplated. The storage device 360 is connected to the system bus 310 by a drive interface. The drives and the associated computer-readable storage media provide nonvolatile storage of computer-readable instructions, data structures, program modules and other data for the computing device 300. In one aspect, a hardware module that performs a particular function includes the software component stored in a tangible computer-readable storage medium in connection with the necessary hardware components, such as the processor 320, bus 310, display 370, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 300 is a small, handheld computing device, a desktop computer, or a computer server.

Although the exemplary embodiment described herein employs the hard disk 360, other types of computer-readable media which can store data that are accessible by a computer, such as magnetic cassettes, flash memory cards, digital versatile disks, cartridges, random access memories (RAMs) 350, and read only memory (ROM) 340, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 300, an input device 390 represents any number of input mechanisms, such as a microphone for speech, a touch-sensitive screen for gesture or graphical input, keyboard, mouse, motion input, speech and so forth. An output device 370 can also be one or more of a number of output mechanisms known to those of skill in the art. In some instances, multimodal systems enable a user to provide multiple types of input to communicate with the computing device 300. The communications interface 380 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system for processing orders from a plurality of consolidation locations, comprising:

a robot comprising at least one consolidation processor and a location tracking device;
at least one memory; and
at least one processor coupled to the at least one memory and configured for:
receiving information about items at each respective consolidation location of the plurality of consolidation locations, the information including an order priority and an associated customer for each respective order, wherein orders associated with different customers are located at the same consolidation location;
receiving location information, from the location tracking device, regarding a location of the robot;
determining a number of available orders for consolidation at each consolidation location in a vicinity of the location of the robot based on the location information;
determining a distance from the location of the robot to each consolidation location in the vicinity of the location of the robot with available orders;
determining an order priority for each respective consolidation location based on order priorities of the available orders at the respective consolidation location;
determining a ratio of the number of available orders to a total number of consolidation sub-locations at each consolidation location;
receiving a respective weight for the distance, the ratio, the order priority of each consolidation location and the available orders for each consolidation location;
determining a priority score based on the distance, the ratio, the order priority of each consolidation location and the available orders for each consolidation location and the respective weights; and
transmitting at least one instruction to the robot based on the priority scores for the plurality of consolidation locations,
wherein the robot is configured to physically move to one of the plurality of consolidation locations based on the at least one instruction and to process orders at that consolidation location.

2. The system of claim 1, wherein the at least one processor is further configured for determining the order priority based on an average of the order priorities forth available orders at each consolidation location.

3. The system of claim 1, wherein the at least one processor is further configured for providing instructions to the robot to select items from the plurality of consolidation locations based on the order priority.

4. The system of claim 1, wherein the at least one processor is further configured for determining the order priority based on a maximum of the order priorities for the available orders at each consolidation location.

5. The system of claim 1, wherein the at least one processor is further configured for determining a zone for the robot based on the location and determining the distance from the robot to consolidation locations in that zone.

6. The system of claim 1, wherein the vicinity is bounded by geographic obstacles.

7. The system of claim 1, wherein the location is monitored based on GPS or Wi-Fi.

8. The system of claim 1, wherein the at least one processor is further configured for adjusting the respective weights throughout a day.

9. A system for processing orders from a plurality of consolidation locations, each consolidation location including a plurality of sub-locations, comprising:
robot comprising at least one consolidation processor and a location tracking device;
at least one memory; and
at least one processor coupled to the at least one memory and configured for:
receiving information about items at each respective consolidation location of the plurality of consolidation locations, the information including an order priority and an associated customer for each respective order, wherein orders associated with different customers are located at the same consolidation location;
receiving location information, from the location tracking device, regarding a location of the robot;
determining a number of available orders for consolidation at each consolidation location in a vicinity of the location of the robot based on the location information;
determining a distance from the location of the robot to each consolidation location in the vicinity of the robot with available orders;
determining an order priority for each respective consolidation location based on order priorities of the available orders at the respective consolidation location;
determining a ratio of the number of available orders to a total number of consolidation sub-locations at each consolidation location;
receiving a respective weight for the distance, the ratio, the order priority of each consolidation location and the available orders for each consolidation location;
determining a priority score based on the distance, the ratio, the order priority of each consolidation location and the available orders for each consolidation location and the respective weights; and
transmitting instructions to the robot based on the priority scores for the plurality of consolidation locations,
wherein based on the instructions, the robot is configured to:
physically move to one of the plurality of consolidation locations;
process orders at that consolidation location;
package orders at that consolidation location based on order priority, order size, and item size;
physically move to a next consolidation location.

10. The system of claim 9, wherein the vicinity is bounded by geographic obstacles.

11. The system of claim 9, wherein the location is monitored based on GPS or Wi-Fi.

12. The system of claim 9, wherein the at least one processor is further configured for determining the order priority based on a maximum of the order priorities for the available orders at the consolidation location.

13. A system comprising:
a robot comprising at least one consolidation processor and a location tracking device;
a computing device; and
a non-transitory computer-readable storage medium having instructions stored which, when executed by the computing device, cause the computing device to perform operations comprising:
receiving information about items at each respective consolidation location of a plurality of consolidation locations the information including an order priority and an associated customer for each respective order, wherein orders associated with different customers are located at the same consolidation location;
receiving location information, from the location tracking device, regarding a location of the robot;
determining a number of available orders for consolidation at each consolidation location in a vicinity of the location of the robot based on the location information;

determining a distance from the location of the robot to each consolidation location in the vicinity of the robot with available orders;

determining an order priority for each respective consolidation location based on order priorities of the available orders at the respective consolidation location;

determining a ratio of the number of available orders to a total number of consolidation sub-locations at each consolidation location;

receiving a respective weight for the distance, the ratio, the order priority of each consolidation location and the available orders for each consolidation location;

determining a priority score based on the distance, the ratio, the order priority of each consolidation location and the available orders for each consolidation location and the respective weights; and transmitting at least one instruction to the robot based on the priority scores for the plurality of consolidation locations, wherein the robot is configured to physically move to one of the plurality of consolidation locations based on the at least one instruction and to process orders at that consolidation location.

\* \* \* \* \*